United States Patent
Stigall

(10) Patent No.: US 7,167,082 B2
(45) Date of Patent: Jan. 23, 2007

(54) SYSTEM, METHOD, AND RECEIVER MODULE FOR ALERTING USERS OF WARNING SIGNALS

(75) Inventor: Robert E. Stigall, Plano, TX (US)

(73) Assignee: RF Monolithics, Inc., Dallas, TX (US)

( * ) Notice: Subject to any disclaimer, the term of this patent is extended or adjusted under 35 U.S.C. 154(b) by 62 days.

(21) Appl. No.: 10/818,095

(22) Filed: Apr. 5, 2004

(65) Prior Publication Data

US 2005/0046562 A1 Mar. 3, 2005

Related U.S. Application Data

(60) Provisional application No. 60/498,374, filed on Aug. 26, 2003.

(51) Int. Cl.
*H04B 3/36* (2006.01)
(52) U.S. Cl. .............................. 340/407.1; 340/539.1; 340/539.11; 340/539.23
(58) Field of Classification Search ............ 340/539.1, 340/539.11, 539.23, 407.1
See application file for complete search history.

(56) References Cited

U.S. PATENT DOCUMENTS

| | | | |
|---|---|---|---|
| 4,937,795 A | 6/1990 | Motegi et al. | |
| 5,198,800 A | 3/1993 | Tozawa et al. | |
| 5,727,758 A | 3/1998 | Penza et al. | |
| 6,044,632 A * | 4/2000 | Schmalz et al. | 56/10.2 R |
| 6,208,260 B1 | 3/2001 | West et al. | |
| 6,218,958 B1 * | 4/2001 | Eichstaedt et al. | 340/7.6 |
| 6,232,887 B1 * | 5/2001 | Carson | 340/903 |
| 6,263,218 B1 * | 7/2001 | Kita | 455/567 |
| 6,400,308 B1 | 6/2002 | Bell et al. | |
| 6,476,724 B1 * | 11/2002 | Slomowitz et al. | 340/686.1 |
| 6,567,523 B1 * | 5/2003 | Ghassabian | 379/433.1 |
| 6,628,201 B1 * | 9/2003 | Cho et al. | 340/600 |
| 6,633,240 B1 * | 10/2003 | Sweatt | 340/995.1 |
| 6,917,300 B1 * | 7/2005 | Allen | 340/686.6 |
| 6,950,019 B1 * | 9/2005 | Bellone et al. | 340/539.11 |
| 6,963,278 B1 * | 11/2005 | Frame | 340/539.22 |
| 2002/0145522 A1 | 10/2002 | Pembroke | |

FOREIGN PATENT DOCUMENTS

FR 2 761 501 A 10/1998
WO WO 02/50796 A1 6/2002

* cited by examiner

*Primary Examiner*—Daryl C Pope

(57) ABSTRACT

A method includes receiving a wireless warning signal. The method also includes identifying a type of warning associated with the wireless warning signal. In addition, the method includes generating at least one stimulus based on the identified type of warning and capable of being detected by a user. As particular examples, the at least one stimulus includes visual and/or tactile stimuli that differ based on the identified type of warning. The visual stimuli may be produced by a stimulator on a hardhat worn by the user. The tactile stimuli may be produced by a stimulator in a wristband worn by the user.

19 Claims, 5 Drawing Sheets

SYSTEM, METHOD, AND RECEIVER MODULE FOR ALERTING USERS OF WARNING SIGNALS

CROSS-REFERENCE TO RELATED APPLICATIONS

This patent application claims priority under 35 U.S.C. § 119(e) to U.S. Provisional Application No. 60/498,374 filed on Aug. 26, 2003 and which is hereby incorporated by reference.

This patent application is related to U.S. patent application Ser. No. 10/818,132 entitled "VEHICLE BACK-UP ALARM SYSTEM, VEHICLE, TRANSMITTER MODULE, AND METHOD" filed on Apr. 5, 2004 and which is hereby incorporated by reference.

TECHNICAL FIELD

This disclosure relates generally to notification systems and more specifically to a system, method, and receiver module for alerting users of warning signals.

BACKGROUND

Different vehicles often include different types of "back-up" alarms. A typical back-up alarm warns when a vehicle has been shifted into reverse gear or is actually moving backwards. A conventional back-up alarm includes an audible device placed on a construction vehicle or other vehicle, such as a horn placed on a forklift, dump truck, or golf cart. The audible device produces warning sounds when the vehicle is placed in reverse gear or begins moving backwards.

SUMMARY

This disclosure provides a system, method, and receiver module for alerting users of warning signals.

In one aspect, a method includes receiving a wireless warning signal. The method also includes identifying a type of warning associated with the wireless warning signal. In addition, the method includes generating at least one stimulus based on the identified type of warning and capable of being detected by a user.

In another aspect, a receiver module includes a receiver capable of receiving a warning signal. The receiver module also includes a controller capable of detecting receipt of the warning signal. In addition, the receiver module includes at least one stimulator capable of generating at least one stimulus in response to the controller detecting the receipt of the warning signal.

In yet another aspect, a system includes a transmitter module capable of communicating a warning signal. The system also includes a receiver module capable of receiving the wireless warning signal, identifying a type of warning associated with the wireless warning signal, and generating at least one stimulus based on the identified type of warning and capable of being detected by a user.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description taken in conjunction with the accompanying drawings, in which.

DETAILED DESCRIPTION

Figure 1:
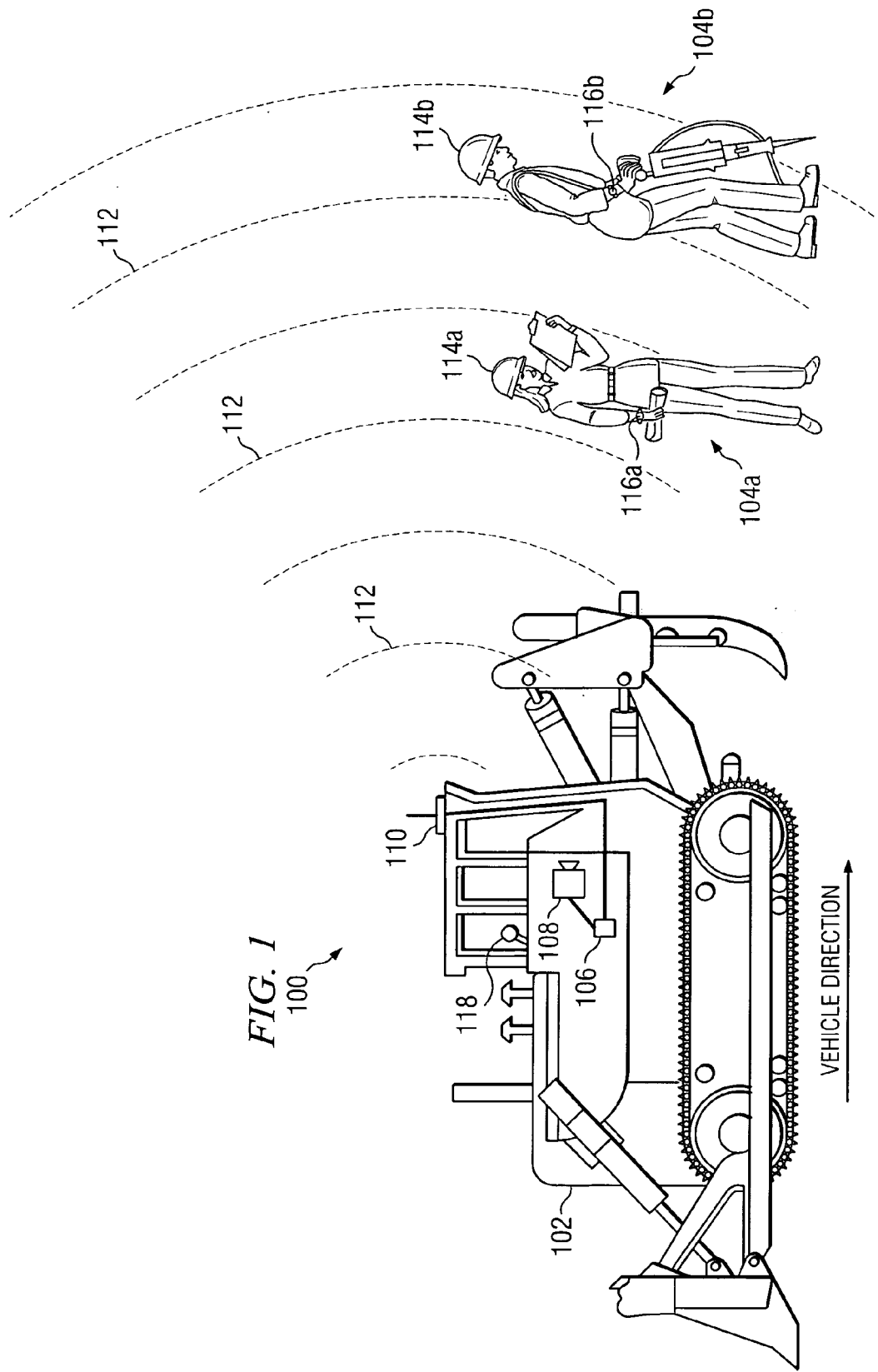
FIG. 1 illustrates an example vehicle back-up alarm system according to one embodiment of this disclosure.

FIG. 1 illustrates an example vehicle back-up alarm system 100 according to one embodiment of this disclosure. In the illustrated example, the alarm system 100 is used in a vehicle 102 to warn one or more users 104a–104b that the vehicle 102 has been shifted into a reverse gear or is moving backwards or in the reverse direction. Other embodiments of the alarm system 100 may be used without departing from the scope of this disclosure.

A problem with conventional vehicle back-up alarms and other alarm systems in general is that warning sounds produced by the alarms may not be heard by users 104a–104b. For example, the warning sounds produced by an alarm may not be heard by a hearing-impaired person. As another example, a person working in a noisy environment, such as a jackhammer operator who is wearing earplugs or other noise muffling devices, may have difficulty hearing the warning sounds. The inability to hear the warning sounds produced by the alarms may place these or other people in danger.

The vehicle 102 represents any suitable vehicle. As an example, the vehicle 102 may represent a vehicle regulated by Occupational Safety and Health Administration (OSHA) regulations, such as 29 C.F.R. § 1926.601(a) and § 1926.602 (a) (9) (i). Under these regulations, a regulated vehicle 102 needs an audible alarm system that is activated when the vehicle 102 is placed into reverse gear or is moving backwards or in the reverse direction. In FIG. 1, the vehicle 102 represents a construction vehicle, although other types of vehicles could be used.

In this example, the vehicle 102 includes a sensor 106 that detects when the vehicle 102 is placed into reverse gear or begins moving backwards. In this document, the terms "reverse" and "backwards" include total and partial backwards or reverse movement by all or a portion of a vehicle or other object or person. When the sensor 106 determines that the vehicle 102 has been placed in reverse gear or is moving backwards, the sensor 106 generates an output signal. The sensor 106 includes any device or structure, such as an electrical circuit, capable of detecting when a vehicle 102 has been placed in a reverse gear or is moving backwards. As a particular example, the sensor may represent a circuit capable of detecting when a driver has shifted a transmission 118 of the vehicle 102 into one of one or more reverse gears.

The output signal generated by the sensor 106 is received by and activates an audible warning device 108. The audible warning device 108 represents any device or devices for producing audible warning sounds, such as a horn or beeper. The sounds emitted by the audible warning device 108 may be heard by users 104a–104b around the vehicle 102, which helps the users 104a–104b to avoid the vehicle 102.

Some of the users 104a–104b around the vehicle 102 may be unable to hear the warning sounds produced by the audible warning device 108. For example, the warning sounds may not be heard by a hearing-impaired person or by a person working in a noisy environment, such as a jackhammer operator who is wearing earplugs.

To more effectively warn the users 104a–104b that the vehicle 102 has been placed in reverse gear or is moving backwards, the vehicle 102 includes a transmitter module 110. When the sensor 106 detects that the vehicle 102 has been placed in reverse gear or is moving backwards or when the audible warning device 108 is activated, the transmitter module 110 transmits warning signals 112 to the users 104a–104b. The transmitter module 110 includes any hardware, software, firmware, or combination thereof for transmitting warning signals 112. In some embodiments, the transmitter module 110 transmits radio frequency ("RF") signals 112 to the users 104a–104b.

The warning signals 112 are received by one or more receiver modules 114a–114b, 116a–116b. The receiver modules 114a–114b, 116a–116b are worn or otherwise in the possession of one or more users 104a–104b. The receiver modules 114a–114b, 116a–116b notify the users 104a–104b that the vehicle 102 is in reverse gear or is moving backwards. As an example, the receiver modules 114a–114b may produce visual indicators or stimuli that are detected by the users' sense of sight, and the receiver modules 116a–116b may produce tactile indicators or stimuli that are detected by the users' sense of touch. As particular examples, the receiver modules 114a–114b may include flashing lights such as light emitting diodes (LEDs), and the receiver modules 116a–116b may vibrate. Other or additional types of stimuli (including audio stimuli) could be used to warn users 104a–104b, and a single receiver module could provide multiple forms of stimuli to a user.

The visual and tactile indicators or stimuli produced by the receiver modules 114a–114b, 116a–116b allow the users 104a–104b to determine when the vehicle 102 is in reverse gear or is moving backwards. The users 104a–104b may make this determination even when the users 104a–104b cannot hear the warning sounds produced by the audible warning device 108. This helps to improve the safety and effectiveness of the vehicle back-up alarm system 100.

Each of the receiver modules 114a–114b, 116a–116b includes any hardware, software, firmware, or combination thereof for notifying a user that a vehicle 102 has been placed in reverse gear or is moving backwards. As particular examples, each of the receiver modules 114a–114b, 116a–116b may represent a portable module that includes a device to produce vibrations, an electromechanical tapping device, an electrical or visual stimulation device, or any other suitable device.

In particular embodiments, the effective range between the transmitter module 110 and receiver modules 114a–114b, 116a–116b may be limited. For example, the effective range may be limited to between 30 and 50 meters. In this way, the receiver modules 114a–114b, 116a–116b may detect signals 112 from vehicles 102 that are closer to the users 104a–104b. This may reduce power consumption and limit or prevent the receiver modules 114a–114b, 116a–116b from receiving signals 112 from vehicles 102 that are not a danger to the users 104a–104b.

In FIG. 1, the transmitter module 110 and the audible warning device 108 are illustrated as separate components in the vehicle 102. The transmitter module 110 and the audible warning device 108 could also be combined into a single unit. This may allow, for example, the individual transmitter module 110 to be installed on existing vehicles 102 that already have audible warning devices 108, while a combined audible warning device 108/transmitter module 110 can be installed in new vehicles 102.

Although FIG. 1 illustrates one example of a vehicle back-up alarm system 100, various changes may be made to FIG. 1. For example, the transmitter module 110 could be placed on any other suitable type of vehicle 102. Also, each of the users 104a–104b may use any number of receiver modules 114a–114b, 116a–116b, such as by using a single receiver module.

Figure 2:
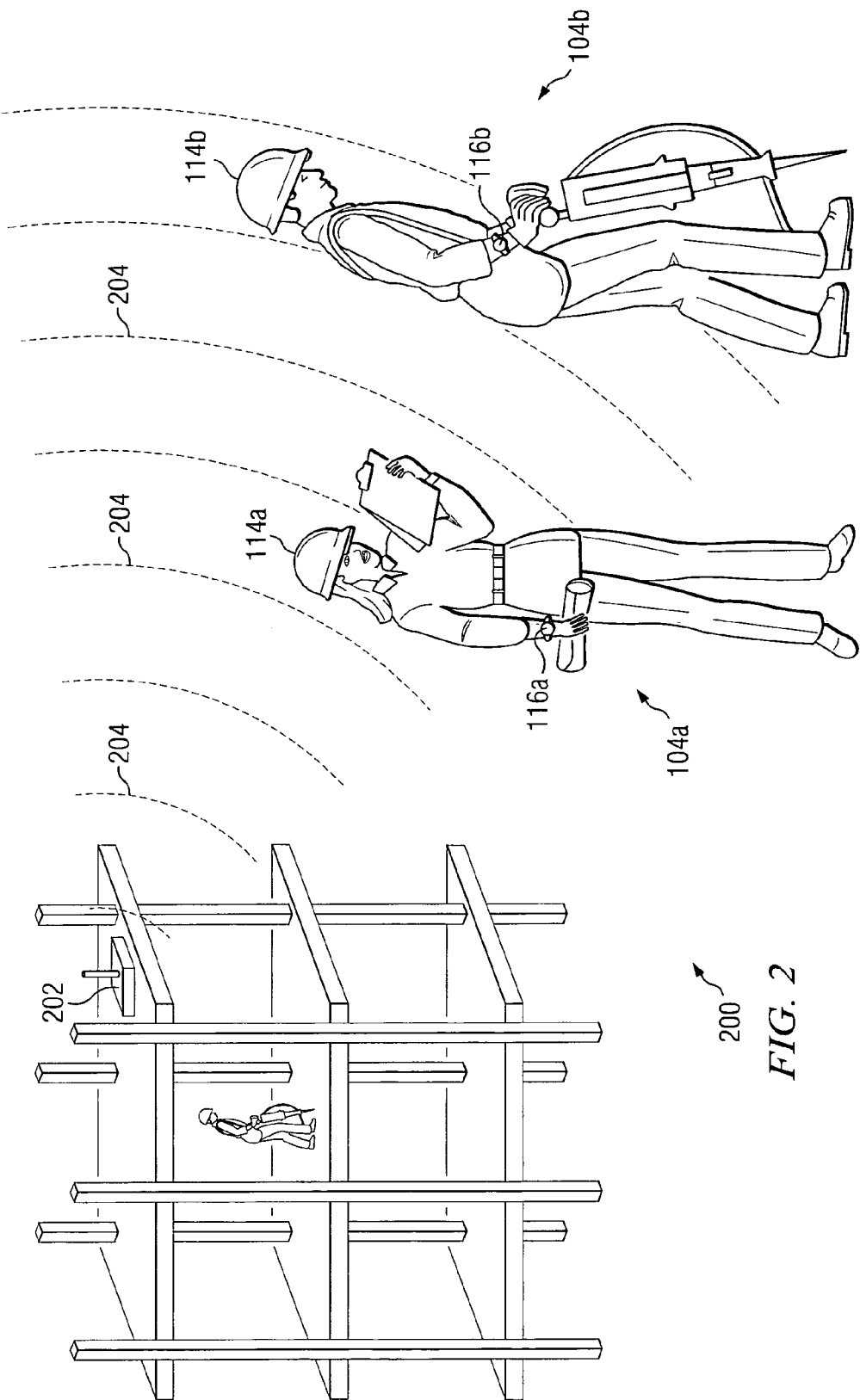
FIG. 2 illustrates an example evacuation alarm system according to one embodiment of this disclosure.

FIG. 2 illustrates an example evacuation alarm system 200 according to one embodiment of this disclosure. In the illustrated example, the alarm system 200 is used to warn one or more users 104a–104b to evacuate a particular location, such as a construction site. Other embodiments of the alarm system 200 may be used without departing from the scope of this disclosure.

As with the vehicle back-up alarm system 100 of FIG. 1, the users 104a–104b in FIG. 2 wear or otherwise possess one or more receiver modules 114a–114b, 116a–116b. In this example, a transmitter module 202 communicates evacuation signals 204 to the users 104a–104b. The receiver modules 114a–114b, 116a–116b receive the evacuation signals 204 and notify the users 104a–104b that the evacuation signals 204 have been received. In some embodiments, the transmitter module 202 transmits RF signals 204 to the users 104a–104b. In particular embodiments, the effective range between the transmitter module 202 and receiver modules 114a–114b, 116a–116b may extend over the entire area where the users 104a–104b may be located, such as over the entire area of a construction site. The transmitter module 202 includes any hardware, software, firmware, or combination thereof for transmitting evacuation signals 204.

Although this has described the transmitter module 202 as transmitting evacuation signals 204 to the users 104a–104b, the transmitter module 202 could transmit any other or additional signals to the users 104a–104b. For example, the transmitter module 202 could transmit signals to the users 104a–104b indicating that the users' shift is over or that a break period has begun or ended.

Although FIG. 2 illustrates one example of an evacuation alarm system 200, various changes may be made to FIG. 2. For example, while FIG. 2 illustrates one transmitter module 202 as being placed on a building, one or more transmitter modules 202 could be placed in any suitable location or locations. Also, each of the users 104a–104b may use any number of receiver modules 114a–114b, 116a–116b, such as by using a single receiver module.

Figure 3:
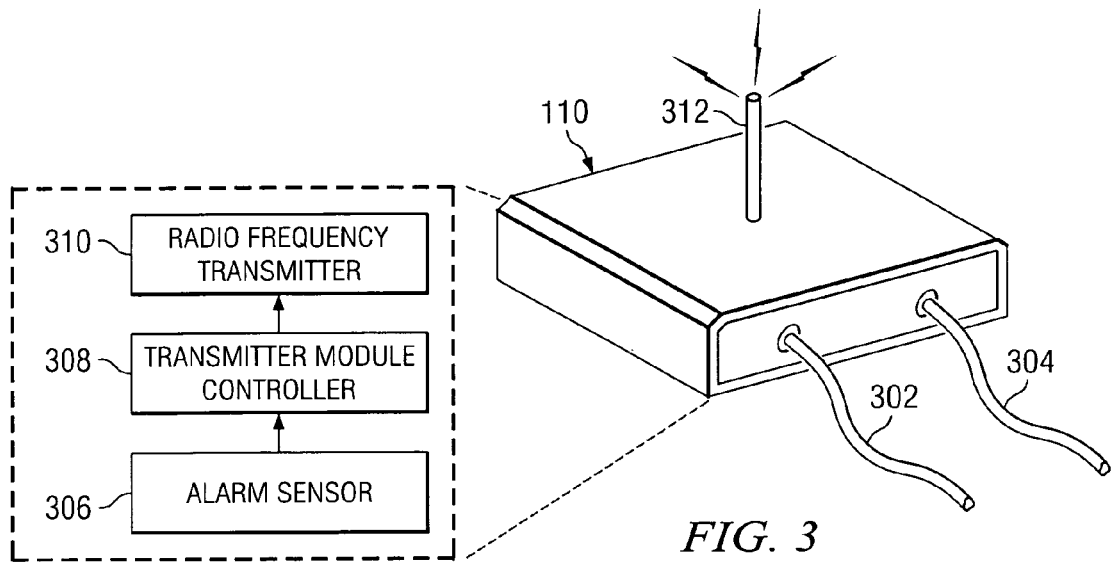
FIG. 3 illustrates an example transmitter module according to one embodiment of this disclosure.

FIG. 3 illustrates an example transmitter module 110 according to one embodiment of this disclosure. In the illustrated example, the transmitter module 110 includes a power line 302, a warning signal line 304, an alarm sensor 306, a transmitter controller 308, a transmitter 310, and an antenna 312. Other embodiments of the transmitter module 110 may be used without departing from the scope of this disclosure.

The transmitter module 110 receives operating power through the power line 302. In some embodiments, the transmitter module 110 receives operating power from the power supply used by the vehicle 102. As a particular example, the transmitter module 110 could receive power through the power line 302 from a battery used by the vehicle 102. In other embodiments, the transmitter module 110 may receive operating power from an internal power supply such as a battery, solar cell, or fuel cell, and the power line 302 would not be needed.

The transmitter module 110 receives an input signal through the warning signal line 304. The input signal indicates that the vehicle 102 has been placed in reverse gear or is moving backwards and that a signal 112, 204 should be transmitted to the users 104a–104b. For example, the warning signal line 304 could be coupled to the sensor 106 of FIG. 1, and the input signal may represent the output signal generated by the sensor 106 that activates the audible warning device 108. In this document, the term "couple" refers to any direct or indirect communication between two or more components, whether or not those components are in physical contact with one another. In this example, the warning signal line 304 carries the output signal from the sensor 106 to the transmitter module 110. The warning signal line 304 may be coupled directly to the sensor 106 or between the sensor 106 and the audible warning device 108.

When the transmitter module 110 receives an input signal over the warning signal line 304, the alarm sensor 306 detects the signal. The alarm sensor 306 then informs the transmitter controller 308 that the input signal has been received. The alarm sensor 306 includes any hardware, software, firmware, or combination thereof for detecting a signal received over the warning signal line 304.

The transmitter controller 308 receives and acknowledges that the alarm sensor 306 has detected the input signal. The transmitter controller 308 also generates or causes the transmitter 310 to generate warning signals 112 for one or more receiver modules 114a–114b, 116a–116b. The transmitter controller 308 includes any hardware, software, firmware, or combination thereof for controlling the operation of the transmitter module 110. As a particular example, the transmitter controller 308 may represent a microprocessor or other processing device, operational amplifiers, memory circuits, or other circuitry.

The transmitter 310 transmits the warning signals 112 to the users 104a–104b. The transmitter 310 includes any hardware, software, firmware, or combination thereof for generating wireless signals. As a particular example, the transmitter 310 may represent a RF transmitter.

The warning signals 112 are communicated to the receiver modules 114a–114, 116a–116b through the antenna 312. The antenna 312 represents any suitable structure for transmitting wireless signals. As a particular example, the antenna 312 represents a RF antenna.

In particular embodiments, the transmitter 310 and antenna 312 represent a low power RF transmitter and antenna that are capable of transmitting the warning signals 112 to the receiver modules 114a–114b, 116a–116b. Also, the transmitter 310 may use any suitable modulation scheme to facilitate communication with the receiver modules 114a–114b, 116a–116b. As particular examples, the modulation schemes could include On/Off Key ("OOK") modulation, Frequency Shift Key ("FSK") modulation, Amplitude Modulation ("AM"), and Frequency Modulation ("FM"). In addition, the range of the transmitted signals 112 may be controllable, such as by establishing a maximum range of 30 meters, 50 meters, 1000 meters, or other suitable distance or distances.

While FIG. 3 illustrates a transmitter module 110, the same or similar structure may be used as the transmitter module 202 in FIG. 2. In the transmitter module 202, the alarm sensor 306 may detect any suitable input. For example, the alarm sensor 306 could detect when a user has depressed an evacuation button or when a monitoring system has sensed a fire, chemical spill, or other dangerous condition. The transmitter module 202 could also be coupled to and receive power from an electrical outlet or other suitable power source. In addition, the transmitter 310 may generate the evacuation signal 204, and the transmitter module 202 may have any suitable effective range such as 1000 meters.

Although FIG. 3 illustrates one example of a transmitter module 110, various changes may be made to FIG. 3. For example, the functional division of FIG. 3 is for illustration only. Various components of FIG. 3 can be combined or omitted and additional components could be added according to particular needs.

Figure 4:
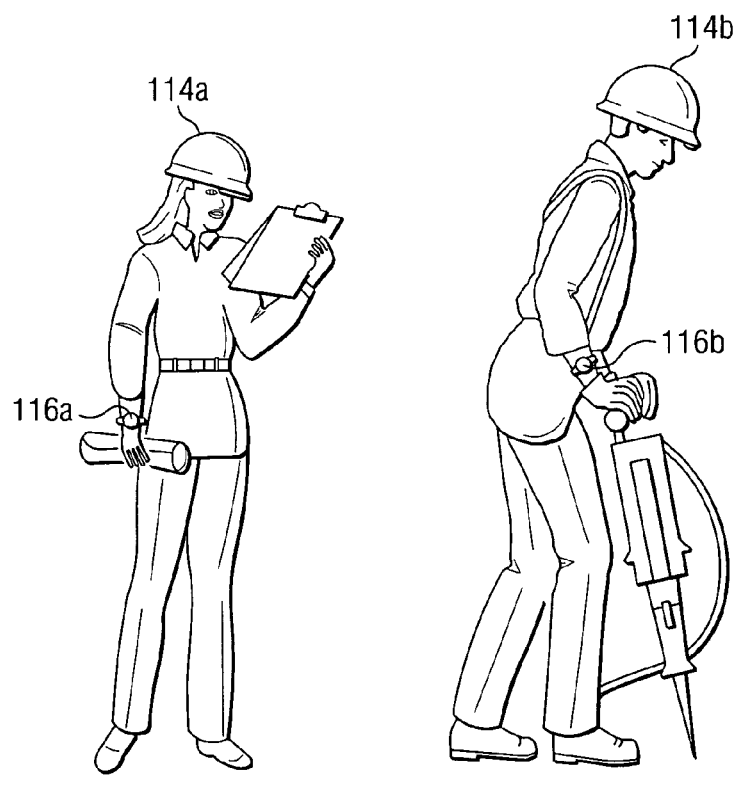
FIG. 4 illustrates example receiver modules according to one embodiment of this disclosure.

FIG. 4 illustrates example receiver modules 114a–114b, 116a–116b according to one embodiment of this disclosure. The receiver modules 114a–114b, 116a–116b shown in FIG. 4 are for illustration only. Other embodiments of the receiver modules 114a–114b, 116a–116b may be used without departing from the scope of this disclosure.

As shown in FIG. 4, the receiver modules 114a–114b are incorporated into hardhats worn by the users 104a–104b. The receiver modules 116a–116b are incorporated into watches, wristbands, or other devices worn around the wrists of the users 104a–104b.

In some embodiments, the receiver modules 114a–114b, 116a–116b use different mechanisms for informing the users 104a–104b that warning signals 112, 204 have been received. For example, the receiver modules 114a–114b may include LEDs or other light-generating elements that produce visual stimuli seen by the users 104a–104b. The receiver modules 116a–116b may generate mechanical signals, electrical signals, or other tactile stimuli that can be felt by the users 104a–104b. This represents example embodiments of the receiver modules 114a–114b, 116a–116b. Each of the receiver modules 114a–114b, 116a–116b could produce one or both of these stimuli and/or other or additional stimuli.

In particular embodiments, the receiver modules 114a–114b, 116a–116b are capable of receiving multiple types of signals, such as when the receiver modules 114a–114b, 116a–116b receive both the vehicle back-up warning signals 112 and the evacuation signals 204. In these embodiments, the receiver modules 114a–114b, 116a–116b could perform different actions depending on the type of signal received. For example, the receiver modules 114a–114b could produce different flashes of light depending on whether the vehicle back-up warning signal 112 or the evacuation signal 204 has been received. Similarly, the receiver modules 116a–116b could produce different vibration patterns depending on whether the vehicle back-up warning signal 112 or the evacuation signal 204 has been received. In this way, the users 104a–104b may easily identify the type of warning signal or other signal that has been received.

Although FIG. 4 illustrates examples of the receiver modules 114a–114b, 116a–116b, various changes may be made to FIG. 4. For example, while FIG. 4 illustrates receiver modules embodied in hardhats and wristbands, the receiver modules could be embodied in any other structure, device, or system. As particular examples, the receiver modules could be embodied in mobile telephones, pagers, personal digital assistants, pendants worn around the neck, or clip-on units worn on the users' clothing.

Figure 5:
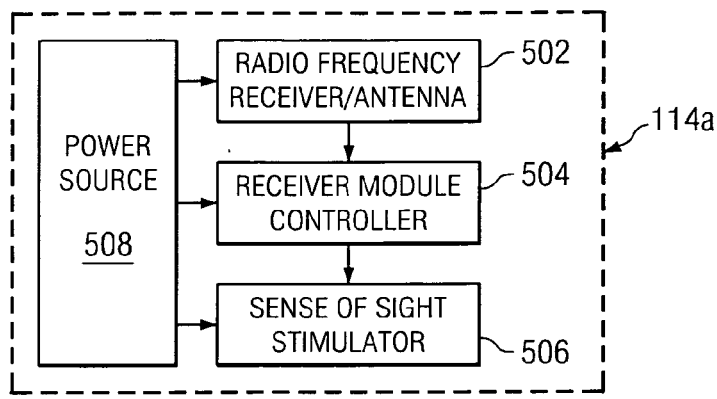
FIG. 5 illustrates additional details of one embodiment of a receiver module according to one embodiment of this disclosure.

FIG. 5 illustrates additional details of one embodiment of a receiver module 114a according to one embodiment of this disclosure. In the illustrated example, the receiver module 114a includes a receiver/antenna 502, a receiver module controller 504, a sense of sight stimulator 506, and a power source 508. Other embodiments of the receiver module 114a may be used without departing from the scope of this disclosure.

The receiver/antenna 502 receives the signals 112, 204 transmitted by the transmitter modules 110, 202. The receiver/antenna 502 transfers the received signals 112, 204 to the receiver module controller 504. The receiver/antenna 502 may also demodulate the received signals 112, 204 before transferring the received signals 112, 204 to the receiver module controller 504. The receiver/antenna 502 represents any hardware, software, firmware, or combination thereof for receiving wireless signals. As a particular example, the receiver/antenna 502 may represent a RF receiver and antenna. Also, the sensitivity of the receiver/antenna 502 may be established to allow reception up to a maximum distance such as 1000 meters, and the selectivity of the receiver/antenna 502 may be established to minimize reception of unwanted RF or other transmissions.

The receiver module controller 504 receives the signals 112, 204 provided by the receiver/antenna 502 and acknowledges the signals. In response to the signals 112, 204, the receiver module controller 504 generates an activation signal to activate the stimulator 506. In particular embodiments, the receiver module controller 504 identifies the type of signal received by the receiver module 114a, such as by determining whether a vehicle back-up warning signal 112 or an evacuation signal 204 was received. Based on the type of signal received, the receiver module controller 504 causes the stimulator 506 to operate in a particular mode associated with the type of signal received. The receiver module controller 504 includes any hardware, software, firmware, or combination thereof for controlling the operation of the receiver module 114a. As a particular example, the receiver module controller 504 represents a microprocessor or other processing device, operational amplifiers, memory circuits, or other circuitry.

The stimulator 506 responds to the activation signal from the receiver module controller 504 by producing visual stimuli perceived by the user's sense of sight. This allows the stimulator 506 to warn the user 104a of possible danger, even when the user 104a cannot hear an audible warning signal. The stimulator 506 may represent any device or structure for producing visual stimuli that can be detected by a user 104a. For example, the stimulator 506 may include one or multiple LEDs capable of generating visual signals. As a particular example, the stimulator 506 may include LEDs of different colors corresponding to different types of signals received by the receiver module 114a.

The receiver/antenna 502, receiver module controller 504, and stimulator 506 are connected internally within the receiver module 114a to the power supply 508. The power supply 508 represents any suitable power supply for the receiver module 114a. For example, the power supply 508 could represent a battery, fuel cell, solar cell, or other source of operating power.

For portability and usability, the receiver module 114a may be contained in a small lightweight package. The receiver package may be of a type of construction to sustain operation in a harsh use environment, such as a construction environment.

Although FIG. 5 illustrates one example of additional details of one embodiment of the receiver module 114a, various changes may be made to FIG. 5. For example, the functional division of FIG. 5 is for illustration only. Various components of FIG. 5 can be combined or omitted and additional components could be added according to particular needs.

Figure 6A:
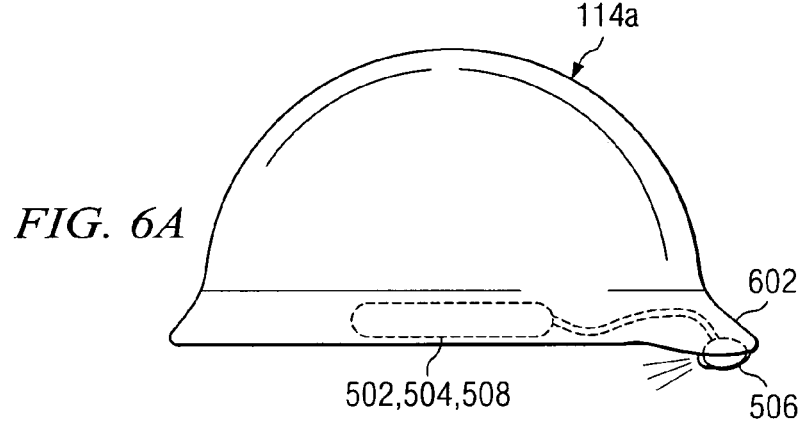
FIG. 6 illustrates an example placement of components of a receiver module according to one embodiment of this disclosure.
Figure 6B:
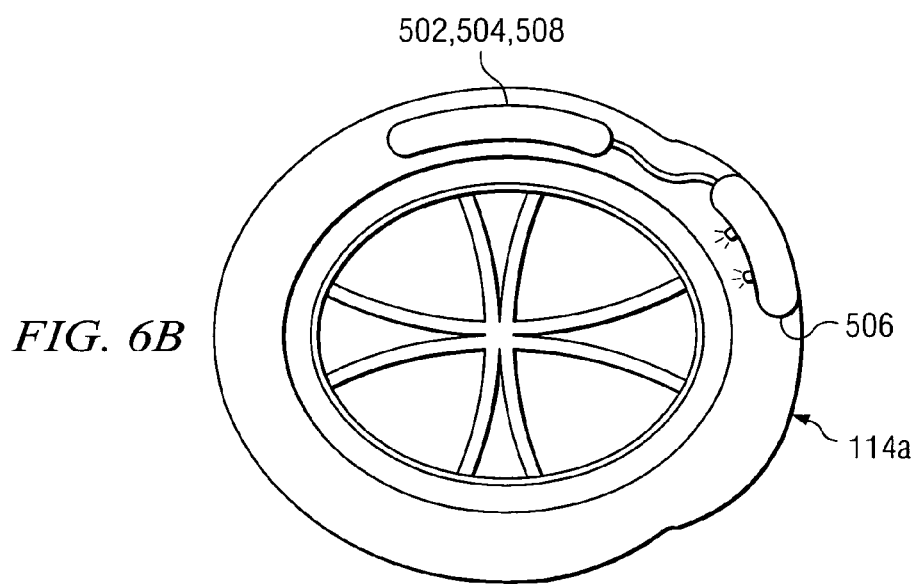

FIG. 6 illustrates an example placement of components of a receiver module 114a according to one embodiment of this disclosure. In particular, FIG. 6 illustrates placement of the components illustrated in FIG. 5 within a hardhat for use by a user 104a. Other placements of components may be used in the receiver module 114a without departing from the scope of this disclosure.

As shown in FIG. 6, the sense of sight stimulator 506 generates visual signals that can be seen by a user 104a. In the illustrated example, the sense of sight stimulator 506 is located generally at the front of the hardhat. In this way, the sense of sight stimulator 506 is located within a field of view of the user 104a.

In this example, the sense of sight stimulator 506 is located on a rim 602 of the hardhat and to one side of the rim 602. This represents one example placement of the sense of sight stimulator 506 in the hardhat. The sense of sight stimulator 506 could be placed at any other suitable location in the hardhat.

The remaining components 502, 504, 508 are placed on the side of the hardhat. While FIG. 6 shows all three components 502, 504, 508 integrated into a single unit in the hardhat, the various components 502, 504, 508 could reside separate from each other in the hardhat.

Although FIG. 6 illustrates one example of the placement of components of a receiver module 114a, various changes may be made to FIG. 6. For example, the various components 502–508 may be placed in any other suitable location or locations.

Figure 7:
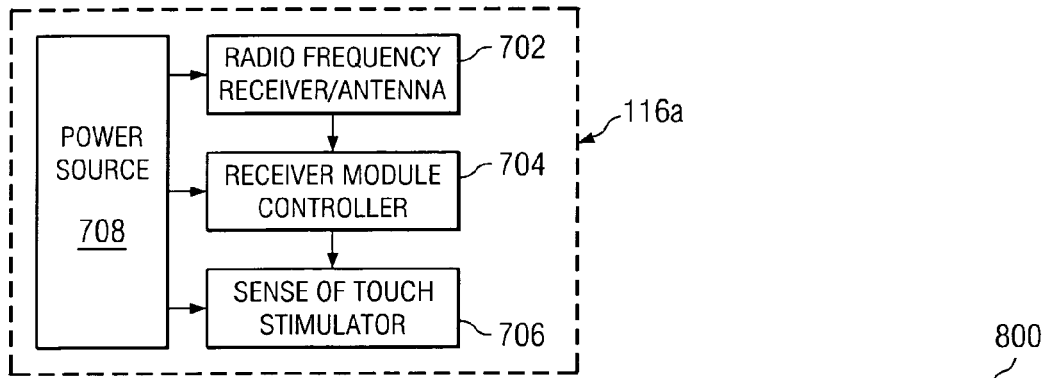
FIG. 7 illustrates additional details of another embodiment of a receiver module according to one embodiment of this disclosure.

FIG. 7 illustrates additional details of another embodiment of a receiver module 116a according to one embodiment of this disclosure. In the illustrated example, the receiver module 116a includes a receiver/antenna 702, a receiver module controller 704, a sense of touch stimulator 706, and a power source 708. Other embodiments of the receiver module 116a may be used without departing from the scope of this disclosure.

The receiver/antenna 702, receiver module controller 704, and power source 708 may be the same as or similar to the receiver/antenna 502, receiver module controller 504, and power source 508, respectively, of FIG. 5.

The sense of touch stimulator 706 is controlled by the receiver module controller 704 and produces mechanical, electrical, or other signals perceived by the user's sense of touch. This allows the stimulator 706 to warn the user 104a of possible danger. The stimulator 706 may represent any suitable device or structure for producing tactile signals that can be detected by a user 104a. For example, the stimulator 706 may include a device to produce vibrations, an electromechanical tapping device, or an electrical stimulation device. As a particular example, the stimulator 706 may be similar to the stimulators used on pagers, mobile telephones, and other mobile devices to notify a user of an incoming page, call, or other communication. In particular embodiments, the stimulator 706 produces different types of tactile signals corresponding to different types of wireless warning signals received by the receiver module 116a.

For portability and usability, the receiver module 116a may be contained in a small lightweight package, such as a wristband, that allows convenient contact with the user's skin. The stimulator 706 may be placed in the package such that it provides a maximum stimulation to the user's sense of touch. The receiver package may be of a type of construction to sustain operation in a harsh use environment, such as a construction environment, although other possible receiver packages may be used.

Although FIG. 7 illustrates additional details of another embodiment of the receiver module 116a, various changes may be made to FIG. 7. For example, the functional division of FIG. 7 is for illustration only. Various components of FIG. 7 can be combined or omitted and additional components could be added according to particular needs.

Figure 8:
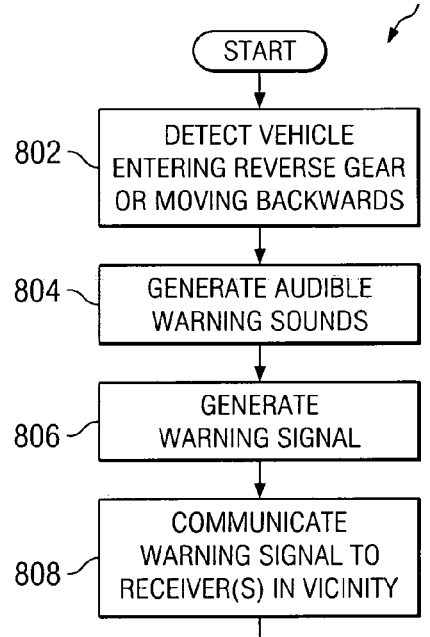
FIG. 8 illustrates an example method for generating a vehicle back-up alarm according to one embodiment of this disclosure.

FIG. 8 illustrates an example method 800 for generating a vehicle back-up alarm according to one embodiment of this disclosure. For ease of illustration and explanation, the method 800 is described with respect to the vehicle back-up alarm system 100 shown in FIG. 1. The method 800 could also be used with any other suitable vehicle back-up alarm system.

The vehicle back-up alarm system 100 detects a vehicle entering a reverse gear or moving backwards or in the reverse direction at step 802. This may include, for example, the sensor 106 determining whether the vehicle 102 has been placed into reverse gear or has begun to move backwards.

The vehicle back-up alarm system 100 generates audible warning sounds at step 804. This may include, for example, the sensor 106 generating an output signal that triggers the audible warning device 108. This may also include the audible warning device 108 generating any suitable warning sounds.

The vehicle back-up alarm system 100 generates a wireless warning signal at step 806. This may include, for example, the alarm sensor 306 in the transmitter module 110 detecting the output signal produced by the sensor 106. This may also include the transmitter controller 308 generating or causing the transmitter 310 to generate a RF signal or other signal 112.

The vehicle back-up alarm system 100 communicates the warning signal to any receiver modules in the vicinity of the vehicle 102 at step 808. This may include, for example, the transmitter 310 in the transmitter module 110 communicating the warning signal 112 through the antenna 312. This may also include the transmitter module 110 communicating the warning signal 112 to any receiver modules 114a–114b, 116a–116b within a specified area around the vehicle 102, such as to any receiver modules 114a–114b, 116a–116b within 30 to 50 meters of the vehicle 102.

Although FIG. 8 illustrates one example of a method 800 for generating a vehicle back-up alarm, various changes may be made to FIG. 8. For example, the warning signal may be communicated over a wide area and need not be limited to the vicinity near a vehicle 102. Also, the vehicle back-up alarm system 100 may only transmit a wireless warning signal and need not generate audible warning sounds.

Figure 9:
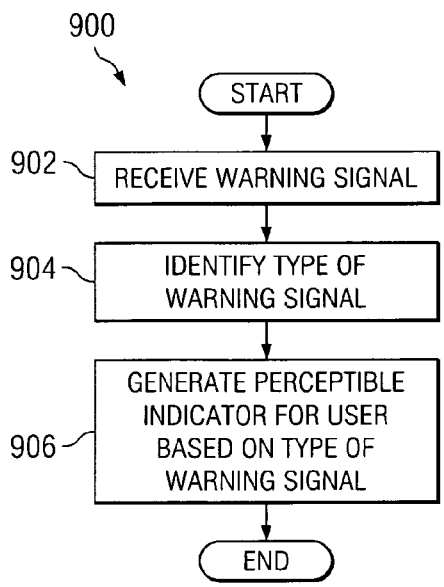
FIG. 9 illustrates an example method for providing a warning indicator to a user according to one embodiment of this disclosure.

FIG. 9 illustrates an example method 900 for providing a warning indicator to a user according to one embodiment of this disclosure. For ease of illustration and explanation, the method 900 is described with respect to the receiver modules 114a–114b, 116a–116b of FIGS. 5 and 7 operating in the systems 100, 200 of FIGS. 1 and 2. The method 900 could also be used by any other suitable receiver module and in any other suitable system.

The receiver module 114a–114b, 116a–116b receives a warning signal at step 902. This may include, for example, the receiver/antenna 502, 702 receiving a warning signal 112, 204 transmitted by a transmitter module 110, 202. This may also include the receiver/antenna 502, 702 forwarding the warning signal to the receiver module controller 504, 704.

The receiver module 114a–114b, 116a–116b identifies the type of warning signal received at step 904. This may include, for example, the receiver module controller 504, 704 determining whether the received warning signal represents a vehicle back-up warning signal 112 or an evacuation signal 204.

The receiver module 114a–114b, 116a–116b generates a perceptible indicator for a user at step 906. This may include, for example, the receiver module controller 504, 704 triggering a sense of sight stimulator 506 and/or a sense of touch stimulator 706. This may also include the receiver module controller 504, 704 triggering the stimulator 506 and/or the stimulator 706 differently based on the type of warning signal received.

Although FIG. 9 illustrates one example of a method 900 for providing a warning indicator to a user, various changes may be made to FIG. 9. For example, the receiver module 114a–114b, 116a–116b could only be able to provide a single indicator or stimulus to a user, and the receiver module 114a–114b, 116a–116b need not identify the type of warning signal received.

It may be advantageous to set forth definitions of certain words and phrases that have been used within this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, software, firmware, or combination thereof. It should be noted that the functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:
   receiving a wireless warning signal;
   identifying one of a plurality of types of warning associated with the wireless warning signal; and
   generating at least one stimulus based on the identified type of warning and capable of being detected by a user, wherein different types of warnings are associated with different stimuli;

wherein the plurality of types of warning comprises (i) a vehicle back-up warning associated with a vehicle being placed in a reverse gear and (ii) an evacuation warning associated with a warning to evacuate a particular location.

2. The method of claim 1, wherein:
the vehicle back-up warning is associated with a construction vehicle being placed in the reverse gear; and
the evacuation warning is associated with a warning to evacuate a construction site.

3. The method of claim 1, wherein generating the at least one stimulus comprises:
generating at least one first stimulus when the wireless warning signal represents the vehicle back-up alarm signal; and
generating at least one second stimulus when the wireless warning signal represents the evacuation signal.

4. The method of claim 3, wherein:
the at least one first stimulus comprises at least one of: a first visual stimulus perceptible to the user's sense of sight and a first tactile stimulus perceptible to the user's sense of touch; and
the at least one second stimulus comprises at least one of: a second visual stimulus perceptible to the user's sense of sight and a second tactile stimulus perceptible to the user's sense of touch.

5. The method of claim 4, wherein:
the first and second visual stimuli are produced by one or more first stimulators on a hardhat worn by the user; and
the first and second tactile stimuli are produced by one or more second stimulators in a wristband worn by the user.

6. The method of claim 4, wherein:
the first and second visual stimuli are associate with at least one of: different colors and different flashing patterns; and
the first and second tactile stimuli are associated with different perceptible patterns.

7. A receiver module, comprising:
a receiver capable of receiving a warning signal;
a controller capable of detecting receipt of the warning signal and identifying one of a plurality of types of warning associated with the warning signal; and
at least one stimulator capable of generating at least one stimulus in response to the controller detecting the receipt of the warning signal and based on the identified type of warning, wherein different types of warnings are associated with different stimuli;
wherein the plurality of types of warning comprises (i) a vehicle back-up warning associated with a vehicle being placed in a reverse gear and (ii) an evacuation warning associated with a warning to evacuate a particular location.

8. The receiver module of claim 7, wherein the at least one stimulator comprises at least one of: a sense of sight stimulator and a sense of touch stimulator.

9. The receiver module of claim 8, wherein each stimulator is capable of:
generating at least one first stimulus when the wireless warning signal represents the vehicle back-up alarm signal; and
generating at least one second stimulus when the wireless warning signal represents the evacuation signal.

10. The receiver module of claim 9, wherein:
the sense of sight stimulator is placed on a hardhat worn by a user; and
the sense of touch stimulator is placed in a wristband worn by the user.

11. The receiver module of claim 9, wherein:
the sense of sight stimulator is capable of producing different visual stimuli based on the identified type of warning, the visual stimuli associate with at least one of: different colors and different flashing patterns; and
the sense of touch stimulator is capable of producing different tactile stimuli based on the identified type of warning, the tactile stimuli associated with different perceptible patterns.

12. A system, comprising:
a transmitter module capable of communicating a warning signal; and
a receiver module capable of receiving the wireless warning signal, identifying one of a plurality of types of warning associated with the wireless warning signal, and generating at least one stimulus based on the identified type of warning and capable of being detected by a user, wherein different types of warnings are associated with different stimuli;
wherein the plurality of types of warning comprises (i) a vehicle back-up warning associated with a vehicle being placed in a reverse gear and (ii) an evacuation warning associated with a warning to evacuate a particular location.

13. The system of claim 12, wherein the transmitter module is capable of transmitting the warning signal in response to a sensor determining that the vehicle is in the reverse gear.

14. The system of claim 12, wherein the receiver module comprises:
a receiver capable of receiving the warning signal;
a controller capable of identifying the type of warning associated with warning signal; and
at least one stimulator capable of generating the at least one stimulus.

15. The system of claim 14, wherein the at least one stimulator comprises at least one of: a sense of sight stimulator and a sense of touch stimulator.

16. The system of claim 15, wherein each stimulator is capable of:
generating at least one first stimulus when the wireless warning signal represents the vehicle back-up alarm signal; and
generating at least one second stimulus when the wireless warning signal represents the evacuation signal.

17. The system of claim 16, wherein:
the sense of sight stimulator is placed on a hardhat worn by a user; and
the sense of touch stimulator is placed in a wristband worn by the user.

18. A system, comprising:
a transmitter module capable of communicating a warning signal; and
a receiver module capable of receiving the wireless warning signal, identifying one of a plurality of types of warning associated with the wireless warning signal, and generating at least one stimulus based on the identified type of warning and capable of being detected by a user;
wherein the transmitter module is capable of communicating an evacuation warning signal; and
wherein the plurality of types of warning comprises (i) a vehicle back-up warning associated with a vehicle being placed in a reverse gear and (ii) an evacuation warning corresponding to the evacuation warning signal, the evacuation warning associated with a warning to evacuate a particular location.

19. A computer program embodied in a computer readable medium and operable to be executed by a processor, the computer program comprising computer readable program code for:

receiving a wireless warning signal;

identifying one of a plurality of types of warning associated with the wireless warning signal; and initiating generation of at least one stimulus based on the identified type of warning and capable of being detected by a user, wherein different types of warnings are associated with different stimuli;

wherein the plurality of types of warning comprises (i) a vehicle back-up warning associated with a vehicle being placed in a reverse gear and (ii) an evacuation warning associated with a warning to evacuate a particular location.

* * * * *

UNITED STATES PATENT AND TRADEMARK OFFICE
CERTIFICATE OF CORRECTION

| | |
|---|---|
| PATENT NO. | : 7,167,082 B2 |
| APPLICATION NO. | : 10/818095 |
| DATED | : January 23, 2007 |
| INVENTOR(S) | : Robert E. Stigall |

It is certified that error appears in the above-identified patent and that said Letters Patent is hereby corrected as shown below:

Column 12, line 35, claim 14, insert -- the -- before the term "warning".

Signed and Sealed this

Third Day of July, 2007

JON W. DUDAS
*Director of the United States Patent and Trademark Office*